Figure 1:
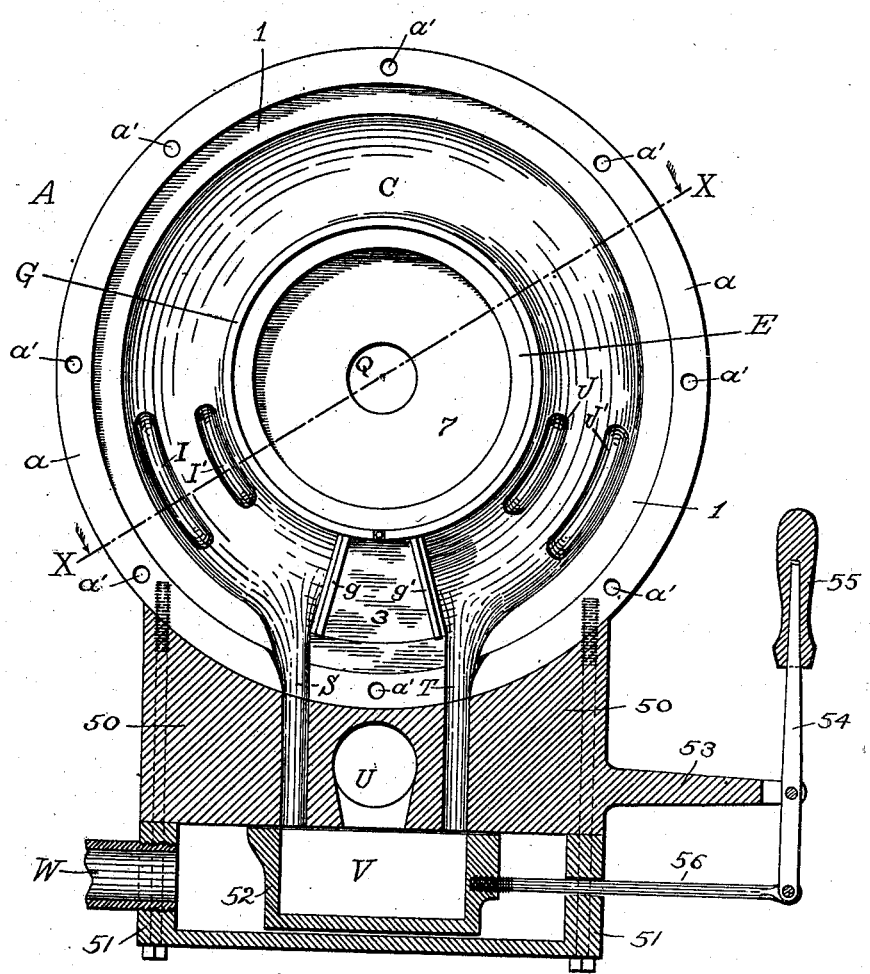

No. 717,244. Patented Dec. 30, 1902.
W. A. MORGAN.
ROTARY ENGINE OR PUMP.
(Application filed Oct. 13, 1902.)

(No Model.) 3 Sheets—Sheet 1.

Witnesses:
S. C. Duvall.
R. E. Randle.

Inventor:
Wm. A. Morgan,
by his attorney,
Robert W. Randle.

No. 717,244. Patented Dec. 30, 1902.
W. A. MORGAN.
ROTARY ENGINE OR PUMP.
(Application filed Oct. 13, 1902.)

(No Model.) 3 Sheets—Sheet 2.

Witnesses:

Inventor:
W^m. A. MORGAN;
by his attorney

No. 717,244. Patented Dec. 30, 1902.
W. A. MORGAN.
ROTARY ENGINE OR PUMP.
(Application filed Oct. 13, 1902.)
(No Model.) 3 Sheets—Sheet 3.

Witnesses:
S. C. Duvall.
R. J. Randle.

Inventor:
WM. A. MORGAN,
by his attorney,
Robert W. Randle.

UNITED STATES PATENT OFFICE.

WILLIAM A. MORGAN, OF DUBLIN, INDIANA.

ROTARY ENGINE OR PUMP.

SPECIFICATION forming part of Letters Patent No. 717,244, dated December 30, 1902.

Application filed October 13, 1902. Serial No. 127,151. (No model.)

*To all whom it may concern:*

Be it known that I, WILLIAM A. MORGAN, a citizen of the United States, and a resident of Dublin, in the county of Wayne and State of Indiana, have invented certain new and useful Improvements in Rotary Engines or Pumps, of which the following is a specification.

The object of the present invention, broadly speaking, is the provision of a device of the class described which will produce a constant unvarying pressure convertible into either rotary power or for pumping water or other fluids.

Another object is to provide a rotary engine or pump composed of a minimum of mechanical parts consistent with the various operations which it is adapted to perform, which will be neat and attractive in appearance, strong and durable in its several parts, and capable of a wide scope of usefulness and efficiency.

Another object is the provision of an article of manufacture (a rotary engine or pump) which can be manufactured and sold at a comparatively low price.

Another object is the provision of a rotary engine or pump which will be simple in character, compact in form, easily operated and maintained, and whereby the operator will be enabled to control its operation so that its work will be performed with certainty and precision.

Another object is the provision of a rotary engine or pump composed of interdependent and coöperating parts so arranged as to produce constant and unvarying source of power.

Other objects and advantages will appear from the following specification and from the drawings forming a part thereof.

The invention consists in a rotary engine or pump embodying certain novel and peculiar features and details of construction and relative disposition of parts, as hereinafter particularly set forth, and it further consists in the legitimate combinations of the features referred to with each other and with other features not yet alluded to and in numerous other subordinate but important combinations and also in certain specific constructions, all of which will be fully described hereinafter.

I attain the above and other objects and other important and subordinate features by the mechanism and arrangement of parts illustrated in the accompanying drawings, forming a part of this specification, in which like indices of reference denote and refer to like parts throughout the several views.

Figure 2:
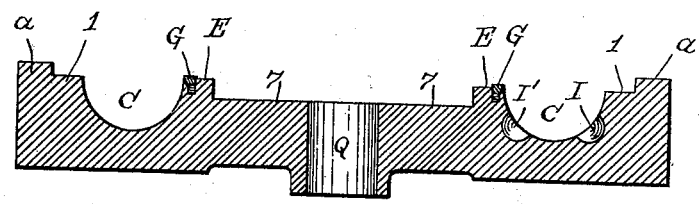
Figure 3:
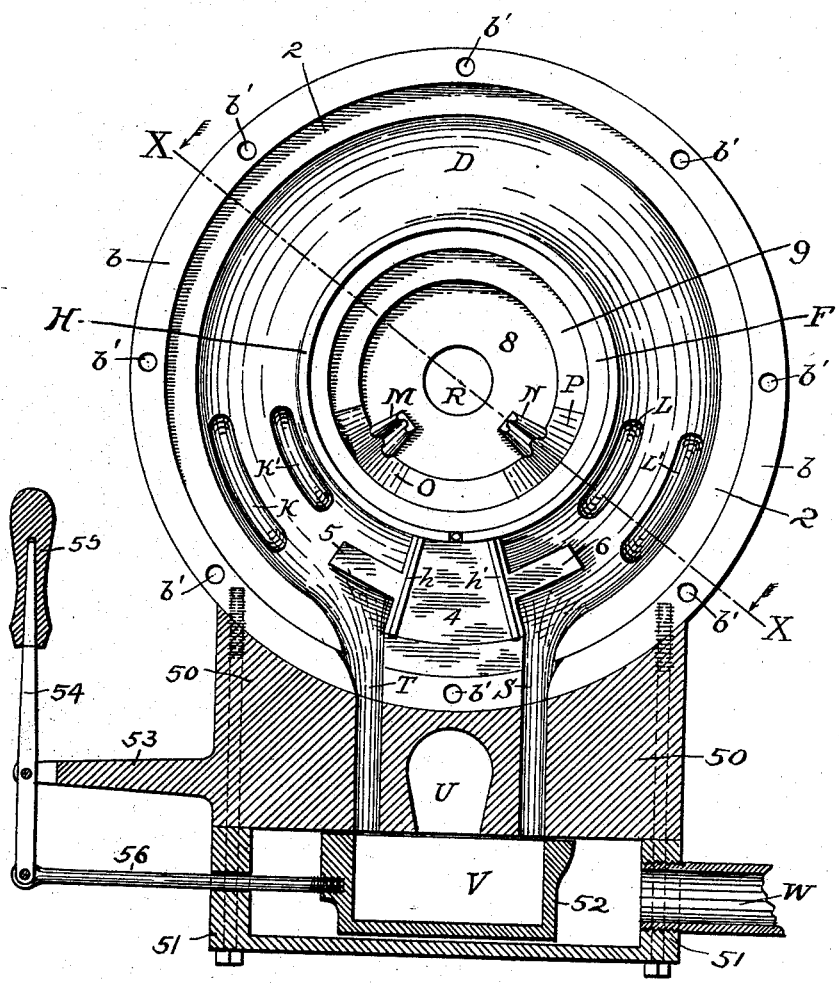
Figure 4:
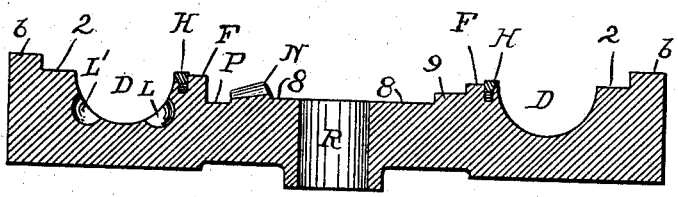
Figure 5:
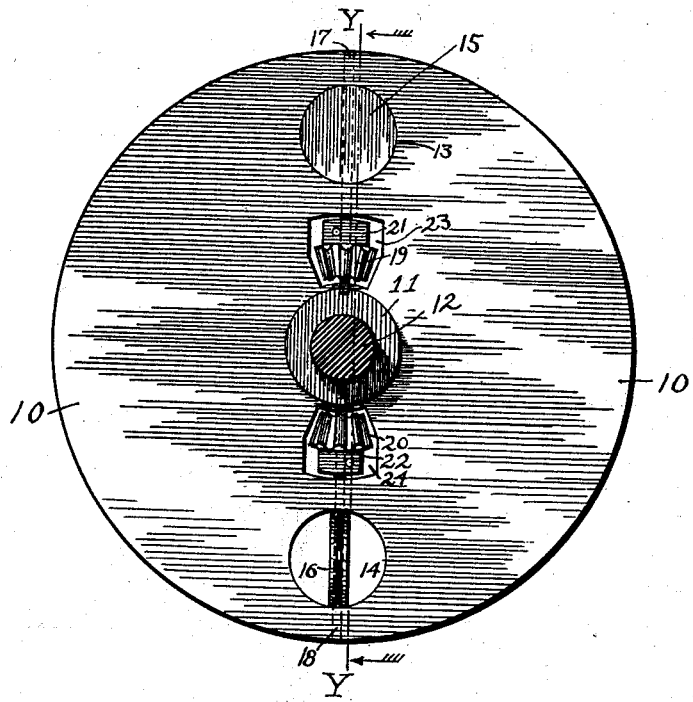
Figure 6:
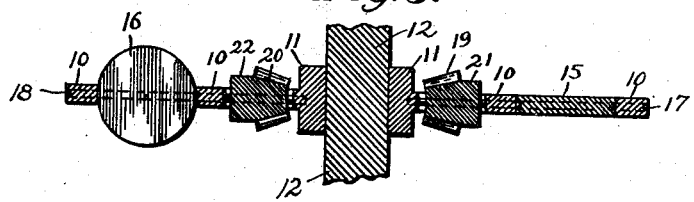
Figure 7:
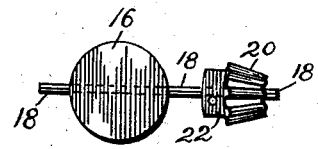
Figure 8:

Referring now to the drawings, Figure 1 shows the interior elevation of one side of my invention and the parts and arrangements peculiar to that side and also a section of the controlling-valve. Fig. 2 is a cross-section of the above taken on the line X X of Fig. 1. Fig. 3 shows the interior elevation of the side opposite to that shown in Fig. 1 and the parts and the arrangements peculiar thereto and also a section of the opposite side of the controlling-valve. Fig. 4 is a cross-section of the above, taken on the line X X of Fig. 3. Fig. 5 is an elevation or plan of the revoluble disk operating between the parts shown in Figs. 1 and 3, the mechanisms carried by said disk, and a section of the main shaft. Fig. 6 is a cross-section of the parts shown in Fig. 5, taken on the line Y Y of said view. Fig. 7 is a detail view of one of the heads, its shaft, and its operative bevel-pinion; and Fig. 8 is an end view of said bevel-pinion.

Referring now to the drawings, A, Fig. 1, represents the right-hand member of the cylindrical casing, and B, Fig. 2, the left-hand member of the same. The interior of the casing is formed into spaces of different widths and elevations by means of the oppositely-disposed corresponding surfaces, as follows: The faces of the chimes $a$ and $b$ are adapted to be brought together and to be secured by bolts to be inserted in the holes $a'$ and $b'$ of the respective members A and B. Immediately adjoining the chimes are the faces 1 and 2, which will be some distance apart when the chimes $a$ and $b$ are contacted, for the purposes hereinafter set forth. Within the faces 1 and 2 in the respective members A and B are circular concave surfaces C and D, forming the cylinder of the engine or pump, whose inner edges terminate on the respective surfaces E and F, which latter are parallel with and on same elevation as the faces 1 and 2. Seated in the outer edges of the surfaces E and F are the respective open packing-rings G and H, which resiliently rise slightly above the surfaces E and F. The channels in which said rings are seated are beveled from the inner edges downward and outward, as shown in Figs. 2 and 4, and the inner edges of said rings are beveled to correspond thereto, by which arrangement it is apparent that as said rings expand their upper surfaces are raised above the surfaces E and F.

In the lower portions of the members A and B are the respective trapezoidal abutments 3 and 4, whose surfaces are on a level with the respective surfaces E, F, 1, and 2, and which entirely close or break the continuity of the respective concave surfaces C and D. In the edges of the respective abutments 3 and 4 at right angles to the surfaces C and D, their inner ends abutting the respective rings G and H, are the two pairs of resilient packing-bars $g$ $g'$ and $h$ $h'$, as shown in Figs. 1 and 3. Radiating from the abutment 4, their upper surfaces on a level therewith, extending centrally into the ends of the concave surface D and parallel therewith, are the oppositely-disposed wings 5 and 6, (shown in Fig. 3,) the purpose of which will hereinafter appear. Into the concave surfaces C and D, below the axial centers thereof, are the oppositely-disposed pairs of grooves or channels I I' and J J' in the face C and K K' and L L' in the face D, whereby the pressure may pass around the pistons when they are at these points.

7 represents a surface within the surface E. 8 represents a smaller opposite surface within the surface F, and 9 represents a surface between the surfaces F and 8 of same diameter as the surface 7. Extending up from the surface 8, Fig. 3, are the two pairs of bevel-gear teeth M and N, which lie parallel with radial lines extending from the center to the periphery of the casing and whose outer ends are on a line with the inner edge of the surface 9. Immediately opposite the teeth M and N and for a slight distance on each side thereof the surface 9 is scalloped out, as represented by O and P, in order to allow the shanks 21 and 22 to revolve therein.

Referring now especially to Figs. 5, 6, 7, and 8, the numeral 10 represents a rotary disk of a thickness substantially equal to the distance between the surfaces 1 and 2 when the chimes $a$ and $b$ are contacted and of substantially the same diameter as said surfaces. 11 represents the hub integral of the disk 10 and of a diameter substantially double the distance between the center of the casing B and the inner ends of the teeth M and N. Extending through and beyond the hub 11, to which it is permanently secured, is the main shaft or axle 12, which is adapted to be journaled in the openings Q and R of the respective members A and B, and to extend beyond the casing at each end to either or both of the projecting outer ends of the axle 12 a pulley (not shown) may be attached, by which power may be transmitted from or to the engine or pump. The numerals 13 and 14 represent two oppositely-disposed openings through the disk 10 near its outer edge opposite to the concave openings C and D, the inner edges of said openings being concave. 15 and 16 represent the two disks or pistons, with convex edges, adapted to fit the respective openings 13 and 14, in which they are adapted to revolve. Shafts 17 and 18 (shown in dotted lines in Figs. 5 and 6) extend in from opposite points in the center of the periphery of the disk 10, through the center of the respective pistons 15 and 16, and the inner ends are seated in opposite sides of the hub 11. 19 and 20 represent bevel gear-pinions facing inward, with outward-extending square shanks 21 and 22 integral thereof, said pinions and shanks being secured to the respective shafts 17 and 18, openings 23 and 24 being formed in the disk 10 for them to rotate in, as shown in Fig. 5. Said pistons 15 and 16 are also secured to the respective shafts 17 and 18 and are carried thereby.

On each side of the abutments 3 and 4 are ports S and T, one-half of each being in each member A and B, whereby the pressure may be admitted or discharged from the cylinder formed by the surfaces C and D.

The disk 10 and the pistons 15 and 16 being assembled, as shown in Fig. 5, they should now be brought to face the member B and one end of the shaft 12 inserted on the opening R, by which the outer edge of the disk 10 will rest on the surface 2, the inner portion resting on the surface F. The member A is now brought to face the member B and the disk 10. The opposite end of the shaft 12 is then inserted in the opening Q, and the chimes $a$ and $b$ are brought into contact and are secured together by bolts passing through the corresponding holes $a'$ and $b'$, by which the opposite side of the disk 10 will be brought into contact with the surfaces 1 and E.

By the above it will be apparent that the disk 10 will be revolubly mounted in the casing and that the two concave oppositely-disposed surfaces C and D will form a cylinder divided in the center by the disk 10. When the pistons 15 or 16 are turned edgewise at right angles to the disk 10, as in the position shown by the piston 16 in Fig. 5, the pistons will completely close the cylinder-space C and D, forming a head.

Referring now to the auxiliary portions, 50 represents a valve-seat (shown in section in Figs. 1 and 3) adapted to be secured to the outside of the casing of the engine.

51 represents the valve-chest, mounted to the valve-seat, as shown.

52 represents a controlling or reversing slide-valve mounted in the valve-chest and adapted to slide therein.

W represents an induction-port leading into the interior of the valve-chest, through which steam, water, or the like may be admitted into the engine. Extending out from one side of the valve-seat 50 is an arm 53, in the end of which is pivoted a lever 54, provided with a handle 55.

56 represents a bar secured to the valve 52, extending through a suitable aperture in the valve-chest, and the outer end is pivoted to the lower end of the lever 54, by which arrangement, it is apparent, the valve 52 may be moved back and forth by operating the handle 55 laterally. The ports S and T extend through the valve-seat and lead into the interior of the valve-chest, as shown in Figs. 1 and 3.

U represents the exhaust-port, leading out through the valve-seat from the center of the valve-chest, and V represents the hollow space formed in the face of the valve 52.

The engine being assembled, as above set forth, it will be seen that should steam, water, gas, or other motive force be admitted into the steam-chest 51 through the inlet W, the lever 54 being perpendicular, as shown in the drawings, it will be apparent that both ports S and T being closed no pressure can be admitted into the casing or into the cylinder of the engine; but should the lever be drawn away from the engine to its full extremity, then the valve 52 will be slid to the left, thus opening the port S into the space V and also opening the port T into the steam-space of the steam-chest, thus allowing the steam or other motive force to pass up through the port T into the cylinder C D on both sides of the disk 10, passing around through the cylinder, down through the port S into the space V, and exhausting through the port U. It is also apparent that should the lever 54 be pushed toward the engine to its full extremity the port T will be brought into communication with the space V and the port S will be brought into communication with the steam-space of the steam-chest, thus allowing the pressure to pass up through the port S into the cylinder on both sides of the disk 10, passing around through the cylinder, down through the port T into the space V, and exhausting through the port U. The disk 10 being placed in position so that the piston 16 will close the cylinder at a point just above the channels L L' and I I', the piston 15 would be in the same position at a point directly opposite to the piston 16. Should pressure now be admitted from the steam-chest 51 through the port S, it will be apparent that the pressure on the piston 16 would force it along in the cylinder. One of the shoulders of the shank 22, contacting with the surface 9, would prevent the piston 16 from revolving. When the piston 16 has moved a slight distance, the gear-teeth 19 would engage the teeth M, and thus give the piston 15 a quarter-turn, carrying it parallel with the disk 10, (the scallop O allowing the shank 21 to turn at this point,) and thus carrying the piston 15 between the abutments 3 and 4. As the pistons 15 and 16 are turned parallel with the disk 10 their forward edges will come into contact with and rest on the surface of the wing 5 or 6, depending on the direction in which the disk 10 is being revolved, and thereby be guided between the abutments 3 and 4. After passing the wing 6 the gear-teeth 19 will engage the teeth N, thus throwing the piston 15 in position to receive pressure, the grooves L L' and I I' preventing it from receiving the pressure until fully in position. At the same time the piston 16 has reached the opposite point in the cylinder, and as the pressure is taken by the piston 15 the piston 16 has reached the grooves K K' and J J', thus relieving the pressure from the piston 16 in order that it may be given a quarter-turn, as above explained. By the above description it will be apparent that pressure will be exerted circumferentially, causing rotation of the disk 10, and consequently of the shaft 12, carried thereby. The steam or air carried ahead of the pistons as they travel in the cylinder and also all waste power issuing therefrom will be exhausted through the port T into the space V and then out through the exit U. By reversing the lever 54 to the opposite direction it will be seen that the port T will become the induction-port and the port S will become the eduction-port, in which case the disk 10 will be revolved in the opposite direction from that above described.

Desiring to use my invention as a pump, I have only to attach a pulley (not shown) to the outer end of the shaft 12, whereby the shaft 12 and the disk 10 may be revolved to the left with power from without the engine at the desired rate of speed. I attach a pipe to the exhaust U and connect it to a supply of water and connect an exhaust hose or pipe to the inlet W and then move the handle 55 toward the casing of the engine or pump. The water will then be drawn in through the exhaust U, carried into the space V, up the port T, around through the cylinder, down through the port S into the steam-space in the chest 51, and discharged through the inlet W.

My invention is perfectly adapted to accomplish the results for which it is intended, and it is evident that changes in and modifications of the specific construction herein shown and described may be made and that analogous parts may be used to accomplish the same results without departing from the spirit of my invention or sacrificing any of its many advantages, and the specific construction of the details of my mechanism in which novel features are embodied may be variously changed without altering the essential principles which are claimed as new.

The terms "upward," "downward," "right hand," "left hand," and other similar terms are used only for convenience of description, and it is not intended by the use of such terms to limit the arrangement of the parts to the specific positions indicated; but they may be variously changed and modified to suit the various requirements of my invention.

I wish it to be distinctly understood that I do not dedicate any part of my invention to the public and that I desire adequate and just protection for every feature of my invention and the various parts herein shown and described that are new and useful and which involve invention.

Having now fully shown and described my invention and the best mode for its construction to me known at this time, what I claim as new, and desire to secure by Letters Patent of the United States, is—

1. In a rotary engine or pump the combination, of a two-part casing united at their edges by contacting flanges secured by bolts or the like, a series of spaces of different widths and elevations formed in the oppositely-disposed faces of the casing, a shaft extending centrally through the casing, a hub secured to the shaft and a disk secured to the hub and adapted to rotate within said casing and to divide the cylinder-space into two equal parts, a pair of oppositely-disposed pistons revolubly mounted in apertures through the disk and adapted when turned at right angles thereto to close the cylinder at that point, means for holding the pistons at right angles to the disk, means for revolving the pistons at predetermined points, a steam-chest secured to the periphery of the casing, ports leading from the cylinder-space into the steam-chest, means for admitting and allowing the steam to pass to and from the cylinder-space into the steam-chest, and means for reversing the movement of the steam through the cylinder all substantially as shown and described.

2. A rotary engine or pump having in combination a two-part circular casing, a circular cylinder-space formed between said parts, abutments oppositely disposed at one point in the cylinder, a disk revolubly mounted between the two parts of the casing, oppositely-disposed circular openings through the disk, pistons revolubly mounted in said openings, means for revolving the pistons automatically at predetermined points, ports leading from the cylinder on each side of the abutments, a steam-chest mounted on the periphery of the casing, induction and eduction ports leading from the cylinder into the steam-chest, and a valve located in the steam-chest with means for operating it from without whereby the disk may be caused to revolve in either direction when pressure is admitted into and allowed to escape from the cylinder, all substantially as shown and described.

3. In combination with a casing, of a large disk mounted on an axle, the circular openings through the large disk, small disks mounted in said openings, the shafts extending centrally through said openings and through the small disks, bevel-pinions mounted on each of said shafts in openings through the large disk, means for turning the pinions to revolve the small disks at certain points, square shanks extending from the pinions whereby the small disks are held at right angles or parallel to the large disk, and a cylinder formed in the casing in which disks are adapted to revolve, all substantially as shown and described, for the purposes set forth.

4. The combination with a circular casing, of a round cylinder-space within and of same contour as the periphery of the casing, of an axle journaled centrally through the casing, a disk mounted on said axle adapted to revolve within said casing, a series of pistons mounted in apertures in said disk, means for turning pistons at two points, abutments located in one point in the cylinder, ports located on each side of the abutments, and a steam-chest and reversing-gear therein connected with said parts, all substantially as shown and described.

5. The combination, substantially as set forth, of the circular two-part casing, a circular cylinder-space within the casing at all points equidistant from its center, an axle extending through the center of the casing, a disk mounted on the axle and revolubly mounted within the casing, pistons mounted in apertures in the casing adapted to fit and operate in the cylinder, means for turning the pistons at certain points to receive the pressure in the cylinder, means for relieving the pressure from the pistons, ports leading from and to the cylinder, whereby the pressure may be admitted and discharged therefrom, and means for reversing the entrance and exhaust of the pressure to cause the disk to operate in different directions.

6. A rotary engine or pump having in combination a casing, a cylinder-space and a disk-space within the casing, a disk revolubly mounted in the casing, an axle extending through the center of the casing secured through the center of the disk, apertures through the disk at points directly in alinement with the cylinder-space, pistons mounted in said apertures on shafts by which they may be turned, means for turning the shafts at certain points whereby the pistons are turned to close the cylinder-space and again turned to open the cylinder-space, the two-part abutment formed in the cylinder-space between the parts of which the disk and the pistons are carried, an induction and an eduction port located at each side of the abutments, means for admitting and discharging the steam through either of the ports to cause the disk to revolve in either direction, and a controlling-valve located without the engine, all arranged and adapted to operate substantially as described and for the purposes set forth.

7. In a rotary engine or pump having a casing, a cylinder-space and a disk-space within the casing, a disk revolubly mounted in the casing, of an open resilient packing-ring surrounding the inner edge of the cylinder-space and adapted to contact with the disk, said ring having a beveled under edge, of a channel formed in the outer edge of the surface adjoining the cylinder-space, said channels formed with a bevel base from the inner edge outward, corresponding with the bevel of said ring, said ring being adapted to rest in said channel, all substantially as shown and described for the purposes set forth.

8. In a rotary engine or pump having a casing, a cylinder-space and a disk-space within the casing, a disk revolubly mounted in the disk, pistons mounted in the disk, abutments located in the cylinder-space, and ports located on each side of the abutments, resilient packing-rings and bars seated in grooves of the inner faces of the casing adapted to contact with the faces of the disk, all substantially as shown and described and for the purposes set forth.

9. In a rotary engine or pump, the combination, with a circular cylinder-casing, an axle extending therethrough on which axle is carried a disk adapted to revolve centrally through the steam-space of the casing, a pair of oppositely-disposed heads revolubly mounted in the disk adapted to revolve in the steam-space, abutments closing the continuity of the steam-space, ports leading from the steam-space on each side of the abutments to the interior of the controlling-valve, the controlling-valve secured on the periphery of the casing, and means for admitting steam to and from the steam-space through said ports, all substantially as shown and described.

In testimony whereof I have hereunto subscribed my name to this specification in the presence of two subscribing witnesses.

WILLIAM A. MORGAN.

Witnesses:
R. W. RANDLE,
R. E. RANDLE.